United States Patent
Xie et al.

(10) Patent No.: US 8,231,755 B2
(45) Date of Patent: Jul. 31, 2012

(54) METHOD FOR ROBOTIC HANDLING USING THERMO-REVERSIBLE DRY ADHESIVES

(75) Inventors: Tao Xie, Troy, MI (US); Richard Michael Schreck, West Bloomfield, MI (US); Xingcheng Xiao, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1139 days.

(21) Appl. No.: 12/105,749

(22) Filed: Apr. 18, 2008

(65) Prior Publication Data

US 2008/0257094 A1    Oct. 23, 2008

Related U.S. Application Data

(60) Provisional application No. 60/925,418, filed on Apr. 20, 2007.

(51) Int. Cl.
- *B29C 65/02* (2006.01)
- *B29C 65/48* (2006.01)
- *B32B 37/12* (2006.01)
- *B32B 37/26* (2006.01)
- *B32B 43/00* (2006.01)

(52) U.S. Cl. ......... 156/247; 156/311; 156/701; 156/711
(58) Field of Classification Search .................. 156/247, 156/311, 701, 711
See application file for complete search history.

(56) References Cited

U.S. PATENT DOCUMENTS

| | | | |
|---|---|---|---|
| 3,784,647 A | 1/1974 | Fleming | |
| 4,552,933 A | 11/1985 | Sellstrom et al. | |
| 4,882,399 A | 11/1989 | Tesoro et al. | |
| 5,002,818 A | 3/1991 | Licari et al. | |
| 5,057,558 A | 10/1991 | Chung et al. | |
| 5,672,402 A | 9/1997 | Kreckel et al. | |
| 5,755,913 A | 5/1998 | Liaw et al. | |
| 5,916,008 A | 6/1999 | Wong | |
| 5,969,006 A | 10/1999 | Onan et al. | |
| 6,042,670 A * | 3/2000 | Kuribayashi et al. | 156/108 |
| 6,156,842 A | 12/2000 | Hoenig et al. | |
| 6,245,173 B1 * | 6/2001 | Kuribayashi et al. | 156/108 |
| 6,589,892 B1 | 7/2003 | Smith et al. | |
| 6,692,807 B2 | 2/2004 | Bries et al. | |
| 6,737,160 B1 * | 5/2004 | Full et al. | 428/397 |
| 6,759,481 B2 | 7/2004 | Tong | |
| 6,773,535 B1 | 8/2004 | Wetzel | |
| 6,793,026 B1 | 9/2004 | De Fazio | |
| 6,798,120 B1 * | 9/2004 | Fearing et al. | 310/331 |
| 6,827,325 B2 | 12/2004 | Hofmann et al. | |
| 6,986,855 B1 | 1/2006 | Hood et al. | |

(Continued)

FOREIGN PATENT DOCUMENTS

JP    05202334 A    8/1993

(Continued)

OTHER PUBLICATIONS

PCT/US2008/060826; Written Opinion and Search Report; Mailed Jun. 30, 2008; 9 pages.

(Continued)

*Primary Examiner* — Sing P Chan

(74) *Attorney, Agent, or Firm* — BrooksGroup

(57) ABSTRACT

One embodiment includes an application of multilayer thermo-reversible dry adhesives in robotic handling of objects.

9 Claims, 1 Drawing Sheet

U.S. PATENT DOCUMENTS

| | | | |
|---|---|---|---|
| 7,188,498 B2 | 3/2007 | Browne et al. | |
| 7,554,787 B2 * | 6/2009 | Pelrine et al. | 361/234 |
| 7,762,362 B2 | 7/2010 | Cutkosky et al. | |
| 7,785,422 B2 * | 8/2010 | Autumn et al. | 134/32 |
| 7,872,850 B2 * | 1/2011 | Pelrine et al. | 361/234 |
| 7,875,144 B2 * | 1/2011 | Kobayashi | 156/247 |
| 8,111,500 B2 * | 2/2012 | Pelrine et al. | 361/234 |
| 8,142,700 B2 * | 3/2012 | Sitti et al. | 264/139 |
| 2001/0047579 A1 | 12/2001 | Lee et al. | |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |
| 2005/0274455 A1 | 12/2005 | Extrand | |
| 2006/0036045 A1 | 2/2006 | Wilson et al. | |
| 2006/0156535 A1 | 7/2006 | Browne et al. | |
| 2006/0188706 A1 | 8/2006 | Kobayashi et al. | |
| 2007/0023137 A1 | 2/2007 | Merz | |
| 2007/0073130 A1 | 3/2007 | Finch et al. | |
| 2007/0289786 A1 | 12/2007 | Cutkosky et al. | |
| 2008/0269420 A1 | 10/2008 | Tong et al. | |

FOREIGN PATENT DOCUMENTS

| | | |
|---|---|---|
| JP | 2003073453 A | 3/2003 |

OTHER PUBLICATIONS

About Foam; Copyright 2005 Foam Rubber Discount Center; 3 pages.
Daltorio et al., A Small Wall-Walking Robot with Compliant, Adhesive Feet; 2005 IEEE/RSJ International Conference on Intelligent Robots and Systems; pp. 4018-4023.
Unver et al., Geckobot: a gecko inspired climbing robot using elastomer adhesives; Robotics and Automation 2006, ICRA 2006. Proceedings 2006 IEEE International Conference; Publication Date: May 15-19, 2006; pp. 2329-2335; Abstract.
EPON Resin 828; Shell Chemicals Online LIterature; http://www2.shellchemical.com/CMM/WEB/GLOBCH . . . printed Oct. 10, 1999; 8 pages.
Lee et al., Handbook of Epoxy Resins; McGraw-Hill Handbook; 2 pages.
Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Liu et al., Chemically Cross-Linked Polycyclooctene: Synthesis, Characterization and Shape Memory Behavior, Macromolecules, 2002. pp. 9868-9874, vol. 35.
Lendlein et al., Biodegradable, Elastic Shape-Memory Polymers for Potential Biomedical Applications, Science, May 31, 2002, pp. 1673-1676, vol. 296.
Lee et al., Structure and Thermomechanical Properties of Polyurethane Block Copolymers with Shape Memory Effect, Macromolecules, 2001, pp. 6431-6437, vol. 34.
Lin et al., Study on Shape-Memory Behavior of Polyether-Based Polyurethanes. I. Influence of the Hard-Segment Content, J. of Applied Polymer Science, 1998, pp. 1563-1574, V.69.
Lin et al., Study on Shape-Memory Behavior of Polyether-Based Polyurethanes. II. Influence of Soft-Segment Molecular Weight, J. of App. Polymer Science, 1998, pp. 1575-1586, 69.
EPON Resin 828 Structural Reference Manual, Shell Chemicals, Houston, TX.
Gall et al., Shape Memory Polymer Nanocomposites, Acta Materialia, 2002, pp. 5115-5126, vol. 50.
Gall et al., Internal Stress Storage in Shape Memory Polymer Nanocomposites, Applied Physics Letter, Jul. 12, 2004, pp. 290-292, vol. 85, No. 2.
Xu et al., Synthesis and Shape Memory Effects of Si-O-Si Cross-Linked Hybrid Polyurethanes, Polymer, 2006, pp. 457-465, vol. 47.
Crystallisation of Liquid DGEBPA and DGEBPF Epoxy Resins, Resolution Performance Products, Product Bulletin, SC:2365-01, Jul. 2001.
Jeffamine D-230 Polyetheramine, Technical Bulletin, Huntsman Corporation, Copyright 2006.
Unver et al., Geckbot: A Gecko Inspired Climbing Robot Using Elastomer Adhesives.
Daltorio et al., A Small Wall-Walking Robot with Compliant, Adhesive, Feet, IEEE/RSJ International Conference on Intelligent Robots and Systems, 2005, pp. 4018-4023.
International Search Report and Written Opinon, International Application No. PCT/US2008/060826 filed Apr. 18, 2008, Applicant GM Global Technology Operations, Inc.
Lee et al., A Reversible Wet/Dry Adhesive Inspired by Mussels and Geckos, Nature, Jul. 19, 2007, pp. 338-342, vol. 448.
Lee et al., Single-Molecule Mechanics of Mussel Adhesion, PNAS, Aug. 29, 2005, pp. 12999-13-3, vol. 103, No. 35.
Veriflex Shape Memory Polymer, http://www.crgrp.net/veriflex.shtml, Cornerstone Research Group, Inc., 2003-2007.
Shape Memory Polymer, http://crgnp.net/success-stories.shtml, Cornerstone Research Group, Inc., 2003-2007.
TEMBO Shape Memory Polymers and Elastic Memory Composite (EMC) Material, http://www.ctd-materials.com/products/emc.htm, Cornerstone Research Group, Inc., 2003-2007.
Behl et al., Shape-Memory Polymers: Dual Shape Materials for Bio-medical Applications, A. Mater. Today, 2007, vol. 10, pp. 1-20.
Bellin et al., Polymeric Triple-Shape Materials, PNAS, Nov. 28, 2006, vol. 103, No. 48, pp. 18043-18047.
Chung et al., Two-Way Reversible Shape Memory in a Semicrystalline Network, Macromolecules, 2008, vol. 41, pp. 184-192.
Rousseau et al., Shape Memory Effect Exhibited by Smectic-C Liquid Crystalline Elastomers, J. Am. Chem. Soc., 2003, vol. 125, pp. 15300-15301.
Liu et al., Review of Progress in Shape-Memory Polymers, Journal of Materials Chemistry, 2007, vol. 17, pp. 1543-1558.
Dietsch et al., A Review—Features and Benefits of Shape Memory Polymers (SMPs), Journal of Advanced Materials, Apr. 2007, vol. 39, No. 2, pp. 3-12.
Li et al., Shape Memory Effect of Ethylene—Vinyl Acetate Copolymers, Journal of Applied Polymer Science, 1999, vol. 71, pp. 1063-1070.
Liu et al., Novel Shape-Memory Polymer with Two Transition Temperatures, Macromol. Rapid Commun., 2005, vol. 26, pp. 649-652.
Reyntjens et al., Polymer Networks Containign Crystallizable Poly(octadecyl vinyl ether) Segments for Shape-Memory Materials, Macromol. Rapid Commun., 1999, vol. 20,pp. 251-255.
Jiang et al., Polymers Move in Response to Light, Advanced Materials., 2006, vol. 18, pp. 1471-1475.
Huang et al., Water-Driven Programmable Polyurethane Shape Memory Polymer: Demonstration and Mechanism, Applied Physical Letters, 2005, Vol, 86, pp. 114105-1-3.
Lendlein et al., Light-Induced Shape-Memory Polymers, Nature, Apr. 14, 2005, vol. 434, pp. 879-882.
Goethals et al., Poly(vinyl ethers) as Building Blocks for New Materials, Macromol. Symp. 1998, vol. 132, pp. 57-64.
Xiao, U.S. Appl. No. 12/273,083, Self-Healing and Scratch Resistant Shape Memory Polymer System, filed Nov. 18, 2008.
Xie, U.S. Appl. No. 11/867,531, Reversible Dry Adhesives, filed Oct. 4, 2007.
Xie, U.S. Appl. No. 12/396,045, Polymer Systems with Multiple Shape Memory Effect, filed Mar. 2, 2009.
Xie, U.S. Appl. No. 12/367,826, A Reversible Welding Process for Polymers, filed Feb. 9, 2009.
Xie, U.S. Appl. No. 12/178,844, High Strength Reversible Noncovalent Adhesion Methods for a Solid Polymer-Polymer Interface, filed Jul. 24, 2008.
Cheng, U.S. Appl. No. 12/359,709, Remote Activation of Thermo-Reversible Dry Adhesives, filed Jan. 26, 2009.
Xie, U.S. Appl. No. 12/423,947, Shape Memory Polymer and Adhesive Combination and Methods of Making and Using the Same, filed Apr. 15, 2009.
Xie, U.S. Appl. No. 12/432,211, Shape Memor Polymers with Surface Having Dangling Adhesive Polymeric Chains and Methods of Making and Using the Same, filed Apr. 29, 2009.
Xie, U.S. Appl. No. 12/181,562, Polymer Systems with Multiple Shape Memory Effect, filed Jul. 29, 2008.

Xie, U.S. Appl. No. 11/867,549, Method of Miniimizing Residue Adhesion for Thermo-Reversible Dry Adhesives, filed Oct. 4, 2007.

Xie, U.S. Appl. No. 12/105,865, Attachment Pad with Thermal Reversible Adhesive and Methods of Making and Using the Same, filed Apr. 18, 2008.

Xie, U.S. Appl. No. 11/867,558, Multilayer Adhesive for Thermal Reversible Joining of Substrates, filed Oct. 4, 2007.

Xie, U.S. Appl. No. 12/391,704, Reversible Dry Adhesives for Wet adn Dry Conditions, filed Feb. 24, 2009.

Xie, U.S. Appl. No. 12/105,749, Method for Robotic Handling Using Thermo-Reversible Dry Adhesives, filed Apr. 18, 2008.

Xie, U.S. Appl. No. 12/105,788, Climbing Devices Based on Thermo-Reversible Dry Adhesives, filed Apr. 18, 2008.

Xie, USSN Oct. 4, 2007, Shape Memory Epoxy Polymers, filed Oct. 4, 2007.

Tao Xie et al, Self-Peeling Reversible Dry Adhesive System, Materials & Processes Laboratory, General Motors Research & Development Center, Chem. Mater. 2008, 20, 2866-2868.

James H. Aubert, Thermally Removable Epoxy Adhesives Incorporating Thermally Reversible Diels-Alder Adducts, The Journal of Adhesion, 79: 609-616, 2003.

International Search Report and Written Opinion, International Application No. PCT/US2008/060796 filed Apr. 18, 2008, Applicant GM Global Technology Operations, Inc.

* cited by examiner

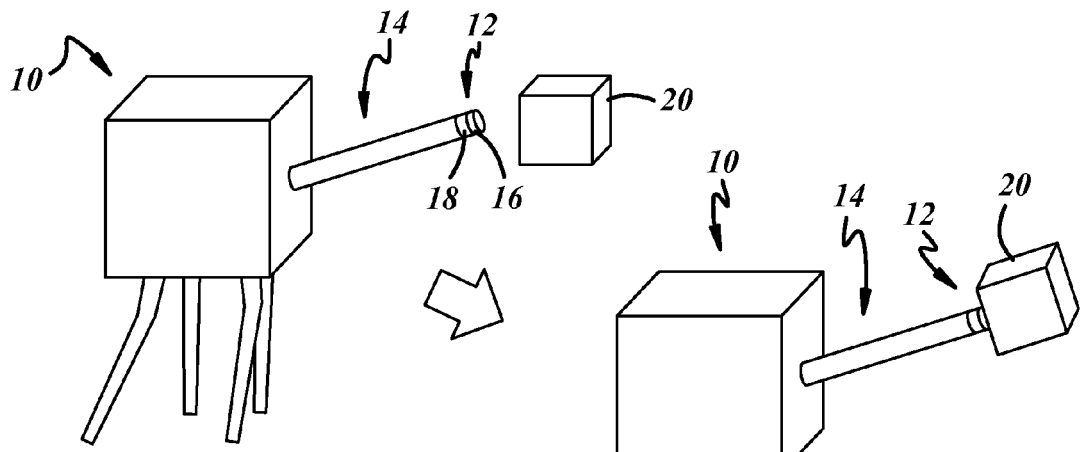
FIG. 1A
FIG. 1B
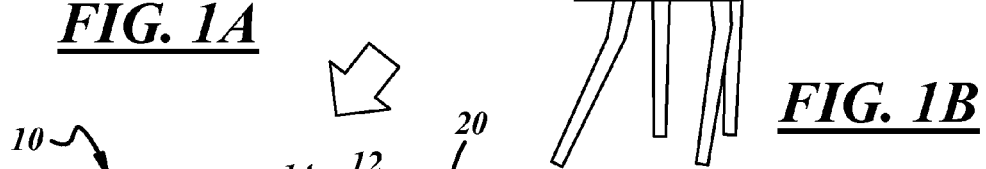
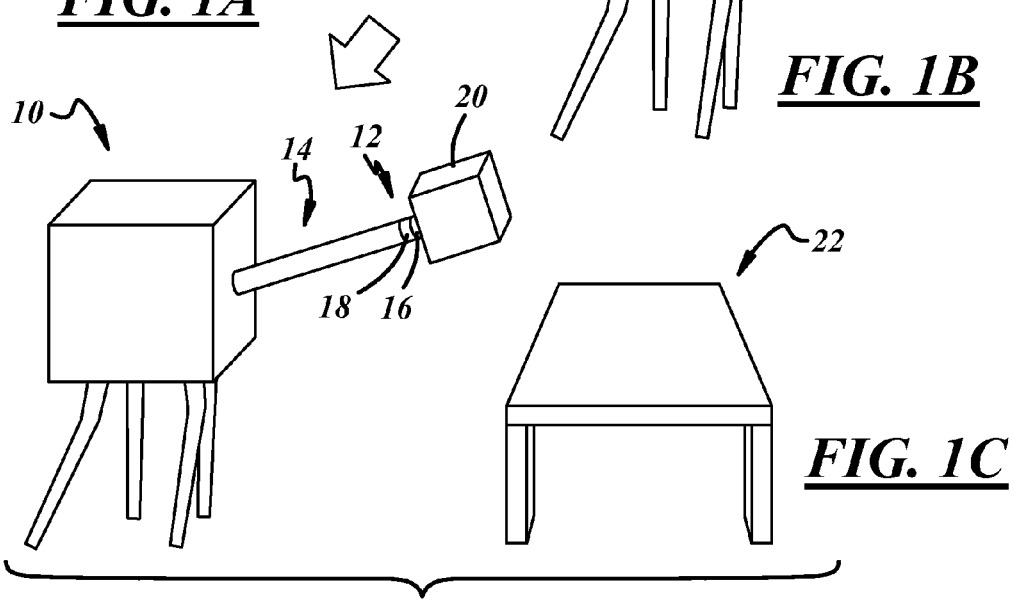
FIG. 1C
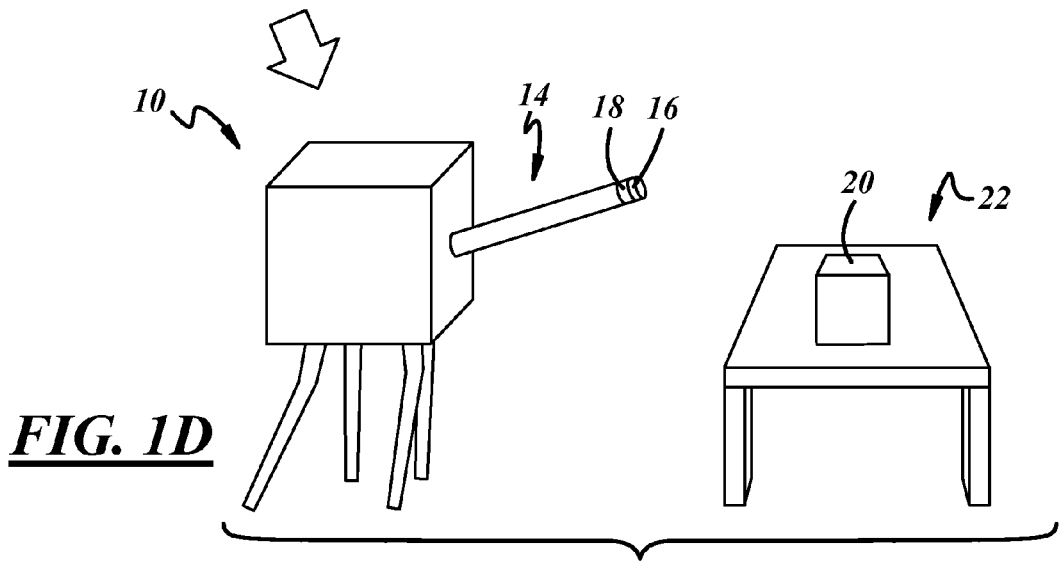
FIG. 1D

METHOD FOR ROBOTIC HANDLING USING THERMO-REVERSIBLE DRY ADHESIVES

This application claims the benefit of U.S. Provisional Application No. 60/925,418, filed Apr. 20, 2007.

FIELD OF THE INVENTION

The field to which the disclosure generally relates includes dry adhesives used in the robotic handling of objects.

BACKGROUND

Gecko feet pads, with nanohair structures on them, are examples of smart dry adhesives. The working principle of the Gecko adhesion is that the nanohair structure allows the foot pad to make maximum contact with a counter surface regardless of its roughness and chemical composition. This is accomplished by nanohairs that are relatively long and protruding from the foot pad at an angle so that adjacent nanohairs can contact the counter surface regardless of its topography. The maximum contact further allows for accumulation of millions of small van der Waals (in the range of microNewtons) interactions between the Gecko foot pad and the counter surface, leading to an overall adhesion force (pull-off force) of about 10 $N/cm^2$. When the detaching force is employed in a peel-off mode, however, the complete detachment is achieved gradually by overcoming small adhesion forces corresponding to very small areas. Thus, the adhesion is easily reversed. Overall, the attractiveness of the Gecko adhesion lies in the combination of adhesive strength (10 $N/cm^2$), reversibility, and the ability to adapt to a variety of surfaces in terms of both the surface roughness and composition. The above unique features of the Gecko adhesion has stimulated scientific research efforts to produce synthetic smart dry adhesives that work using the same principle as the Gecko feet. Up to now, the two best synthetic Gecko adhesives show maximum pull-off force of 3 and 10 $N/cm^2$, respectively. Both adhesives suffer from severe adhesion loss after only one or two attaching/detaching cycles, as a result of breakdown of the nano structures. Often this occurs when adjacent elongated structures simulating the nano hairs of the Gecko foot pad bond to each other. In addition, synthetic Gecko adhesives are expensive to produce and large-scale manufacturing is practically too difficult.

SUMMARY OF EXEMPLARY EMBODIMENTS OF THE INVENTION

One embodiment includes an application of multilayer thermo-reversible dry adhesives in robotic handling of objects.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein:

FIG. 1A illustrates a method according to one embodiment.

FIG. 1B illustrates a method according to one embodiment.

FIG. 1C illustrates a method according to one embodiment.

FIG. 1D illustrates a method according to one embodiment.

DETAILED DESCRIPTION OF EXEMPLARY EMBODIMENTS

The following description of the embodiment(s) is merely exemplary in nature and is in no way intended to limit the invention, its application, or uses.

Referring to FIGS. 1A-1D, one embodiment of the invention includes a robot 10 having a thermo-reversible dry adhesive 12 on a portion of the robot, for example but not limited to on the tip of a robot arm 14. In one embodiment, at least one of a heating or cooling wire may be provided and embedded in the robot arm. In another embodiment, at least one of a heating or cooling wire may be attached to the thermo-reversible dry adhesive. In various embodiments, the thermo-reversible dry adhesive may comprise a dry adhesive layer 16 and a shape memory polymer layer 18.

Still referring to FIGS. 1A-1D, one embodiment includes a method of picking up an object 20 using the robot 10 having the thermo-reversible dry adhesive 12 on a portion of the robot, for example the robot arm 14. Referring to FIG. 1A, the dry adhesive layer 16 may first be heated by a brief electrical current through the heating wire to a temperature above the glass transition temperature of the shape memory polymer. Then the dry adhesive layer on the robot may be pressed against the intended object 20 to make contact, as shown in FIG. 1B. The dry adhesive layer may then be cooled down either by natural cooling or using a cooling wire. This causes a strong adhesive bond to be formed between the dry adhesive layer and the object. In one embodiment, the pull-off force may be approximately 40 $N/cm^2$ relative to glass, but the pull-off force may vary depending upon the object. The strong adhesion between the object and the dry adhesive layer allows the object to be moved by the robotic arm.

As shown in FIG. 1C, in one embodiment, the robot arm 14 may be controlled to carry the object 20 to a target location 22. Then the object 20 may be released at the target location by heating the dry adhesive layer again using electrical current through the heating wire to a temperature above the glass transition temperature of the shape memory polymer, as illustrated in FIG. 1D. In one embodiment, the detachment of the object from the dry adhesive layer requires only a relatively small force, for example about 0.5 $N/cm^2$. In another embodiment, the detachment requires only a small force of about 0.3 $N/cm^2$. In another embodiment, the detachment requires a force not greater than 2 $N/cm^2$.

In another embodiment, a Peltier thermal electric device, which is capable of both heating and cooling, may be utilized to heat and cool the thermo-reversible dry adhesive. The Peltier device may include a PN junction and may be constructed and arranged so that current flowing through the PN junction in one direction causes the device to heat one side thereof and current flowing through the PN junction in the opposite direction causes one side thereof to cool the device.

In one embodiment, the robot having a thermo-reversible dry adhesive on the tip of the robot arm may be used to handle a wide variety of large objects. For example, the robot may be used to handle windshield glass in an automotive assembly plant. In one embodiment, the dry adhesive is heated and pressed against the surface of the windshield glass. Upon cooling, a strong adhesive bond is formed and the windshield glass may be moved with the robot arm. Once the windshield glass is in place, the dry adhesive and robot arm may be detached from the glass by heating the dry adhesive.

In various embodiments, the dry adhesive layer 16 may be an epoxy elastomeric dry adhesive. In various embodiments, the shape memory polymer layer 18 may be an epoxy shape memory polymer. In various embodiments, the components of the dry adhesive or the components of the shape memory polymer may include a rigid epoxy and a flexible epoxy. The range of possible crosslinking chemistries which may be used to achieve a dry adhesive or shape memory polymer may include alpha, omega-diaminoalkanes, organic multi-carboxylic acid, anhydride, or catalytic (as in imidazole type) crosslinking reactions. There are many different ways to achieve the appropriate relationships between the molecular properties. For example, the dry adhesives or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. In one embodiment, the components of the dry adhesive may be present in an amount sufficient to provide, upon curing of the composition, a dry adhesive having a glass transition temperature ($T_g$) of $-90°$ C. to $200°$ C. and having a pull-off strength of $1$-$200$ N/cm$^2$ from a substrate. In another embodiment, the dry adhesive may have a glass transition temperature of $-90°$ C. to $25°$ C. In one embodiment, the components of the shape memory polymer composition may be present in an amount sufficient to provide, upon curing of the composition, an epoxy shape memory polymer having a change in storage modulus of 2 to 3 orders of magnitude before and after its glass transition.

One embodiment of the invention includes a multilayer thermo-reversible dry adhesive having a first layer made from an aromatic diepoxide (rigid epoxy), an aliphatic diepoxy (flexible epoxy), and a diamine curing agent, and a second layer made from an aliphatic diepoxy and an amine. In one embodiment the multilayer thermo-reversible dry adhesive has a curved structure.

Numerous shape memory polymers may be utilized in various embodiments of the invention. For example, starting with a typical aromatic diepoxy/diamine system with a $T_g$ of about $90°$ C., the aromatic epoxy component is replaced systematically with an aliphatic diepoxy to yield a series of epoxy shape memory polymers with $T_g$'s ranging from $3°$ C. to $90°$ C. As such, a shape memory polymer may be tailored for use with a dry adhesive as desired for a particular application operated within certain temperature ranges.

Some embodiments refer to a multilayer epoxy dry adhesive. It should be understood that more than two layers may be utilized. For example, there may be two or more layers of the shape memory polymer layer, which may be in a side by side relationship or an overlying relationship. Likewise, there may be two or more dry adhesive layers in a side by side relationship or an overlying relationship. As such, a device with custom or tailored properties may be manufactured.

One embodiment of the invention includes a method of making a multilayer thermo-reversible dry adhesive comprising heating 3.6 g of EPON 826 (the diglycidyl ether of bisphenol A epoxy monomer) to about $75°$ C. and mixing the same with 2.16 g of neopentyl glycol diglycidyl ether (NGDE) and 2.3 g of Jeffamine D-230, which is the curing agent poly(propylene glycol)bis(2-aminopropyl)ether. Jeffamine D-230 is a polyetheramine that is difunctional, primary amine with an average molecular weight of about 230. The primary amine groups are located on secondary carbons at the end of the aliphatic polyether chain. Jeffamine is available from Huntsman.

The mixture was then poured into an aluminum pan and cured in an oven at about $100°$ C. for 1.5 hours. Then a mixture of 2.6 g of NGDE and 1.15 g of an amine such as Jeffamine D-230 was poured into the aluminum pan on top of the first cured epoxy layer and cured for 1.5 hours at $100°$ C. In a third step, the oven temperature was raised to $130°$ C. for post-curing for about one hour. At the end of the post-curing, the cured two-layer epoxy was demolded. A double layer epoxy was obtained with the first layer which had a thickness of about 2 mm and functioned as a shape memory polymer with a glass transition of about $45°$ C. and a second layer as a dry adhesive having a thickness of about 1 mm. The yielded double layer epoxy structure had a slightly curved structure due to the thermal mismatch between the first and second layers. This curvature can also be created by specifically designed molds to achieve the curved structure.

The above description of embodiments of the invention is merely exemplary in nature and, thus, variations thereof are not to be regarded as a departure from the spirit and scope of the invention.

What is claimed is:

1. A method of moving an object comprising:
   providing a robot having a robot arm and a thermo-reversible dry adhesive attached to the robot arm;
   heating the dry adhesive and pressing the adhesive against an object to make contact;
   cooling down the adhesive so that a strong adhesive bond is formed;
   controlling the robot arm to carry the object to a target location; and
   releasing the object comprising heating the dry adhesive again and using a force not greater than 2 N/cm$^2$ to detach the robot arm and adhesive from the object.

2. A method as set forth in claim 1 wherein the adhesive bond has a pull-off force greater than 10 N/cm$^2$.

3. A method as set forth in claim 1 comprising using a force not greater than 0.3 N/cm$^2$ to detach the robot arm and adhesive from the object.

4. A method as set forth in claim 1 wherein the thermo-reversible dry adhesive comprises a shape memory polymer layer and a dry adhesive layer underlying the shape memory polymer layer.

5. A method as set forth in claim 4 wherein the dry adhesive layer comprises:
   at least one of a rigid epoxy or a flexible epoxy; and
   at least one of a crosslinking agent or a catalytic curing agent;
   wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

6. A method as set forth in claim 4 wherein the shape memory polymer layer comprises:
   at least one of a rigid epoxy or a flexible epoxy; and
   at least one of a crosslinking agent or a catalytic curing agent;
   wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

7. A method as set forth in claim 1 wherein the object comprises a sheet of glass.

8. A method as set forth in claim 1 wherein the robot further comprises a thermal electric device comprising a PN junction constructed and arranged so that current flowing through the PN junction in one direction causes the device to heat one side thereof and current flowing through the PN junction in the opposite direction causes one side thereof to cool the device, the thermal electric device being positioned to heat and cool the thermo-reversible dry adhesive.

9. A method as set forth in claim 1 wherein the object comprises an automotive windshield glass.

* * * * *